United States Patent [19]
Cherabuddi

[11] Patent Number: 5,835,947
[45] Date of Patent: Nov. 10, 1998

[54] CENTRAL PROCESSING UNIT AND METHOD FOR IMPROVING INSTRUCTION CACHE MISS LATENCIES USING AN INSTRUCTION BUFFER WHICH CONDITIONALLY STORES ADDITIONAL ADDRESSES

[75] Inventor: Rajasekhar Cherabuddi, Sunnyvale, Calif.

[73] Assignee: Sun Microsystems, Inc., Mountain View, Calif.

[21] Appl. No.: 656,402

[22] Filed: May 31, 1996

[51] Int. Cl.$^6$ .................................................. G06F 13/00
[52] U.S. Cl. ....................... 711/125; 711/137; 395/383; 395/584
[58] Field of Search .................................. 395/452, 383, 395/584, 585; 711/125, 137

[56] References Cited

U.S. PATENT DOCUMENTS

| | | | |
|---|---|---|---|
| 4,691,279 | 9/1987 | Danilenko et al. | 395/383 |
| 5,170,476 | 12/1992 | Laakso | 711/140 |
| 5,454,087 | 9/1995 | Narita et al. | 395/587 |
| 5,553,270 | 9/1996 | Rosenbluth | 711/169 |
| 5,586,295 | 12/1996 | Tran | 711/137 |

*Primary Examiner*—Glenn Gossage
*Attorney, Agent, or Firm*—Flehr Hohbach Test Albritton & Herbert LLP; William S. Galliani

[57] ABSTRACT

A central processing unit (CPU) of a computer and a method for reducing memory latencies in a computer memory hierarchy are described. The CPU includes an external cache controller and a primary memory controller. An instruction buffer in the primary memory controller stores an address from a primary memory page corresponding to a previous address request. A comparator circuit of the primary memory controller is used to compare a present address request corresponding to an instruction cache miss signal to the address stored in the instruction buffer. If an instruction buffer hit is achieved, memory latencies associated with the external cache controller and the primary memory controller are avoided. If an instruction buffer miss is experienced, the primary memory controller, under predetermined conditions, stores, in the instruction buffer, an address following an address corresponding to data from a primary memory page specified by the present address request. This operation frequently results in the instruction buffer storing early, i.e., prefetching, an address request that may be subsequently called by a computer program. When this is achieved, an address request may be rapidly retrieved without incurring the memory latency overhead of the external cache controller and the primary memory controller. The predetermined conditions may include that the address request corresponds to an instruction, and that an address follow signal and a memory controller free signal are generated. In alternative embodiments, the instruction buffer may be checked for a miss before or after the external cache is checked for a cache miss.

2 Claims, 8 Drawing Sheets

CENTRAL PROCESSING UNIT AND METHOD FOR IMPROVING INSTRUCTION CACHE MISS LATENCIES USING AN INSTRUCTION BUFFER WHICH CONDITIONALLY STORES ADDITIONAL ADDRESSES

BRIEF DESCRIPTION OF THE INVENTION

This invention relates generally to retrieving data from computer memories. More particularly, this invention relates to a technique of improving instruction cache miss latencies by pre-fetching and storing selected data from a computer primary (main) memory.

BACKGROUND OF THE INVENTION

Figure 1:
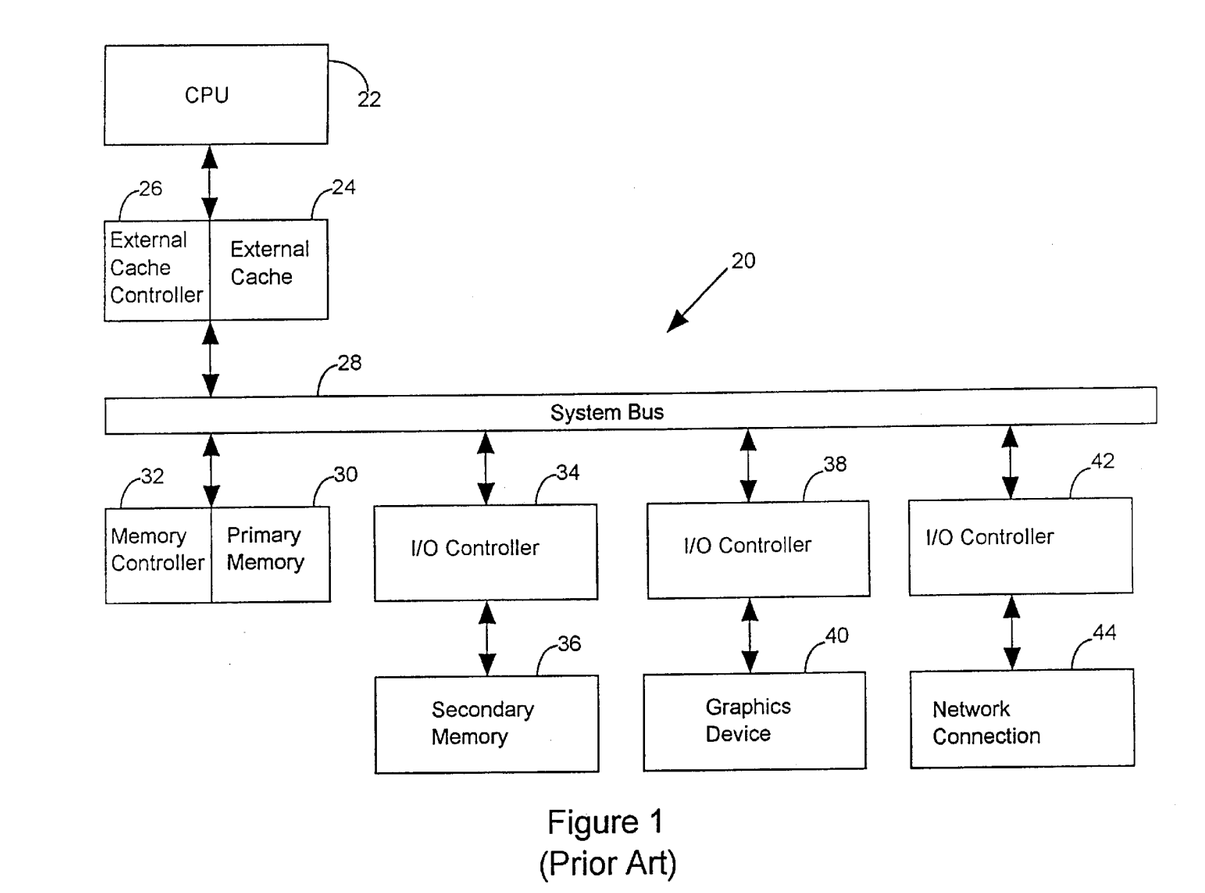
FIG. 1 illustrates a general purpose computer in accordance with the prior art.

FIG. 1 is an illustration of a general purpose computer 20. The computer 20 includes a central processing unit (CPU) 22. The CPU 22 executes instructions of a computer program. Each instruction is located at a memory address. Similarly, the data associated with an instruction is located at a memory address. The CPU 22 accesses a specified memory address to fetch the instruction or data stored there.

Most CPUs include an on-board memory called an internal cache. The internal cache stores a set of memory addresses and the instructions or data associated with the memory addresses. Instructions are typically stored in an instruction cache of the internal cache, while data is stored in a data cache of the internal cache. If a specified address is not in the internal, or level on (L1), cache, then the CPU 22 looks for the specified address in an external cache, also called level two (L2) cache 24. The external cache 24 is coupled to an associated external cache controller 26.

If the address is not in the external cache 24 (a cache miss), then the external cache 24 requests access to a system bus 28. When the system bus 28 becomes available, the external cache 24 is allowed to route its address request to the primary (main) memory 30. The primary memory 30 is coupled to an associated memory controller 32.

Figure 2:
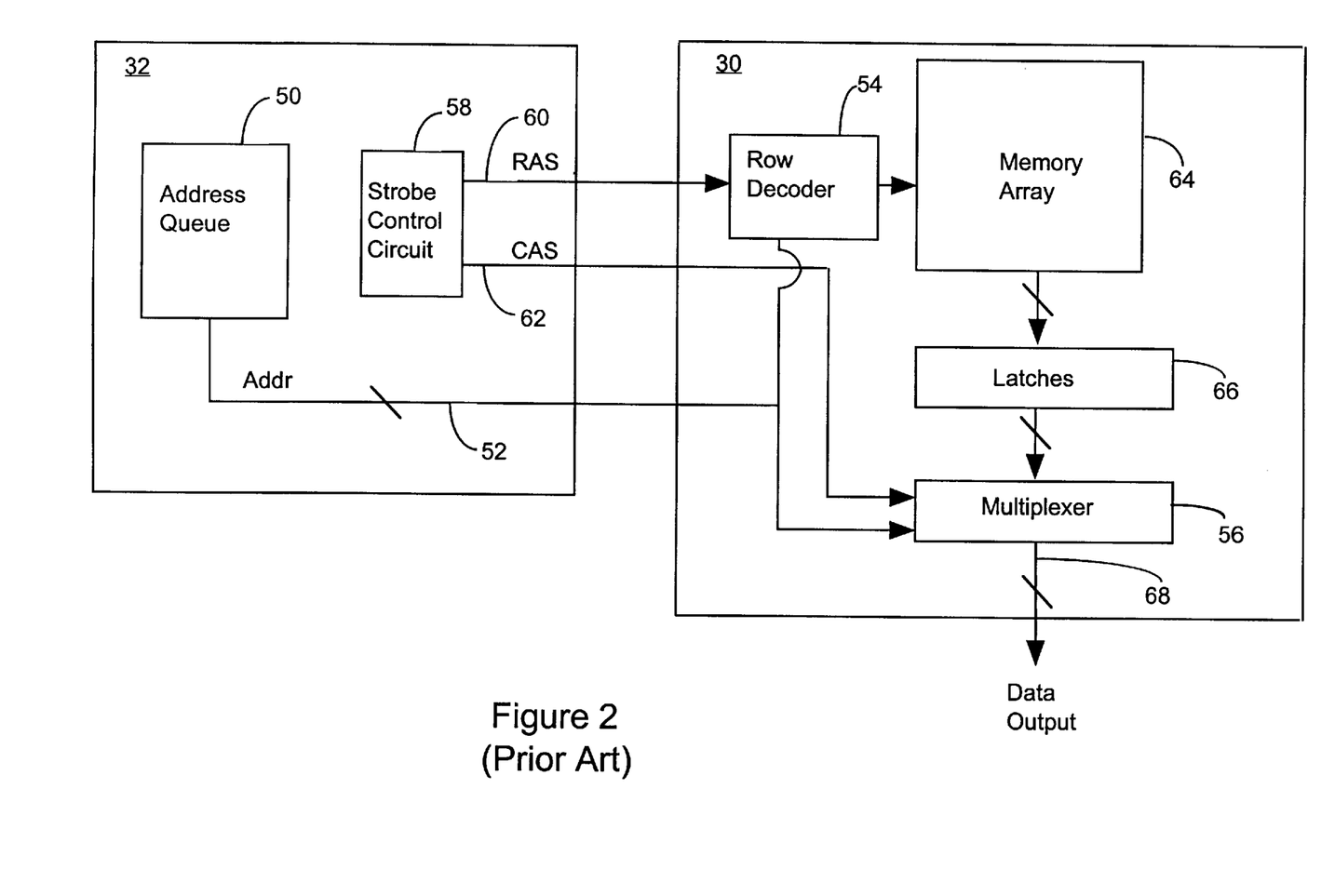
FIG. 2 illustrates a primary memory controller and primary memory in accordance with the prior art.

FIG. 2 illustrates a memory controller 32 and its associated primary memory 30. The memory controller 32 includes an address queue 50 to store address requests received from the system bus 28. An address from the queue 50 is applied to the bus 52, which routes the address to a row decoder 54 and a multiplexer 56. A strobe control circuit 58 is used to enable either the row decoder 54 or the multiplexer 56. In particular, the row decoder 54 generates a Row address Strobe (RAS) signal on line 60 or a Column address Strobe (CAS) signal on line 62.

When an address and the RAS signal are applied to the row decoder 54, the row decoder 54 specifies a row of values in a memory array 64. The row of values, also called a memory page, is then passed into a set of latches 66. Selected columns from the row (or page) of data are then specified with the address signal. That is, a subsequent address signal is used to specify selected columns in the row. The subsequent address signal is used as a multiplexer select signal, enabled by the CAS signal. Thereafter, the multiplexer 56 generates a data output signal on an output bus 68.

Figure 3:
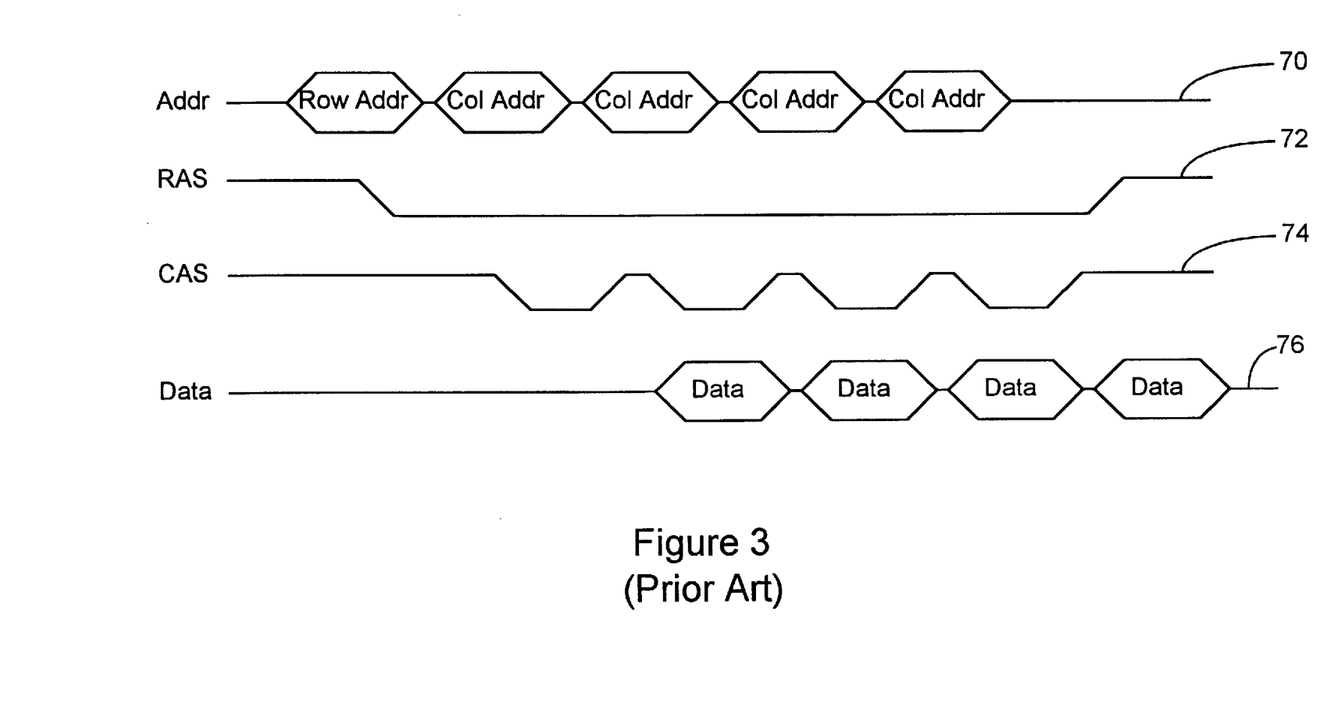
FIG. 3 is a set of waveforms illustrating the operation of the circuit of FIG. 2.

The foregoing operation is more fully appreciated with reference to FIG. 3. Waveform 70 illustrates a row address being asserted, followed by a set of column addresses. These signals are applied to the bus 52 of FIG. 2. The same bus 52 is used for both the row and column addresses in order to save package pins and thereby reduce package costs. The row address (Row Addr) is routed to the row decoder 54 as the RAS signal is deasserted or made (active) low, as shown with the waveform 72 going from high to low. The combination of the row address and the deasserted RAS signal allows the row decoder 54 to access a row in the memory array 64, resulting in the row being driven into the latches 66.

Note that the RAS signal is deasserted after the row address is launched. This time delay is for the purpose of allowing the row address to reach the row decoder. Thus, it can be appreciated with reference to FIG. 3 that there is a delay involved with launching a row address. It would be highly desirable to improve primary memory access times by eliminating this delay.

After a row of values is driven into the latches 66, a first set of data is read from the latches 66 with the multiplexer 56, as a first column address and a deasserted CAS signal are received at the multiplexer 56. The first deassertion of the CAS signal is shown with the waveform 74. The first deassertion of the CAS signal, as shown in FIG. 3, is slightly delayed with respect to its corresponding column address, as in the case of the previously described RAS signal. This operation results in a first set of output data being driven onto the bus 68. The first set of output data is shown with the waveform 76. The RAS signal continues to be deasserted, shown with the waveform 72, as the subsequent column address signals, shown with the waveform 70, are applied to the multiplexer 56. The subsequent column address signals are timed to (arrive at the multiplexer 56 during the deassertion of the CAS signal), as shown with the waveform 74. This operation produces three subsequent sets of data. Depending upon the system, the data of the waveform 76 may not be returned until after the second, third, or fourth column address is asserted. A relatively quick return of data is illustrated for convenience.

Note that after the last column address is sent, the RAS signal is asserted (goes high) once again. If a new address is to be fetched from primary memory, the RAS signal must be deasserted (made low) again, and the foregoing processing must be repeated.

Returning now to FIG. 1, the data output from the primary memory 30 is applied to the system bus 28. It is then stored in the external cache 24 and is passed to the CPU 22 for processing. The processing described in reference to FIGS. 1–3 must be performed for every address request. Indeed, if the address request is not found in the primary memory 30, similar processing is performed by an input/output controller 34 associated with a secondary memory 36.

Figure 4:
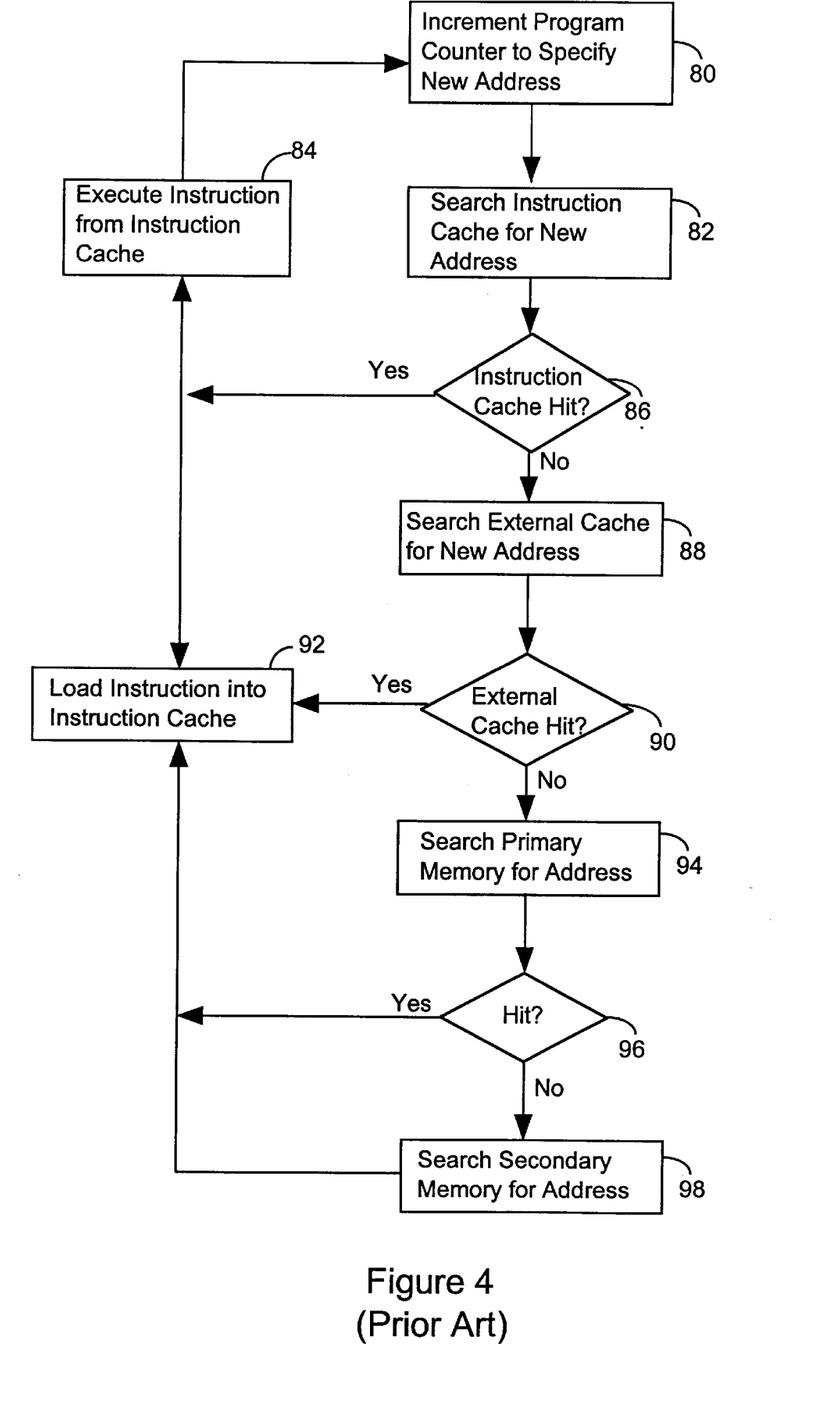
FIG. 4 illustrates the prior art processing of an address through a computer memory hierarchy.

The processing of an address request through a memory hierarchy is illustrated in FIG. 4. The first processing step is to increment a program counter of the CPU 22 to specify a new address (step 80). The CPU 22 can distinguish instructions from data in a program. When an address corresponds to an instruction, the instruction cache of the internal cache is searched (step 82). If the address request exists in the instruction cache (an I$ hit), as tested at step 86, then the instruction in the instruction cache is executed (step 84). If there is an instruction cache miss, then the external cache is searched for the address (step 88).

If the address request is found in the external cache (an external cashe (E$) hit), as tested at step 90, then the instruction from the external cache is loaded into the instruction cache (step 92) and processing proceeds to step 84. If the address is not found in the external cache, then primary memory is searched for the address request (step 94). If the address request is found in primary memory, as tested at step 96, then it is loaded into the instruction cache (step 92), otherwise the address is retrieved from secondary memory (step 98).

The further the CPU 22 has to go into the memory hierarchy, the longer the delay experienced by the CPU 22. Thus, it is always highly desirable to circumvent memory hierarchy levels. In addition, it is highly desirable to reduce the processing time associated with any given memory hierarchy level.

As shown in FIG. 1, there are additional devices connected to the system bus 28. For example, FIG. 1 illustrates an input/output controller 38 operating as an interface between a graphics device 40 and the system bus 28. In addition, the figure illustrates an input/output controller 42 operating as an interface between a network connection circuit 44 and the system bus 28.

The multiple connections to the system bus 28 result in a relatively large amount of traffic. Consequently, there are delays associated with passing information on the system bus 28. System bus 28 delays prevent improvements in the memory controller 32 that require the passing of information between the external memory controller 32 and the CPU 22. Optimizations of the memory controller 32 that require the passing of information to the CPU 22 are also discouraged since they typically involve additional signal lines. It is important to reduce the number of pins associated with a CPU package, thus using additional signal lines for memory controller optimizations is not a practical option.

Despite the obstacles preventing improvements to primary memory controllers, it is important to realize improvements in primary memory access times. Primary memory latencies are not improving as much as CPU speeds. Thus, primary memory latencies are increasingly reducing the execution performance of CPUs.

In view of the foregoing, it would be highly desirable to improve the performance of a primary memory controller. The performance improvements should not involve additional bandwidth requirements on the system bus 28, nor should they require additional signal lines into the CPU 22.

SUMMARY OF THE INVENTION

A central processing unit of a computer includes an external cache controller and a primary memory controller. An instruction buffer in the primary memory controller stores an address from a primary memory page corresponding to a previous address request. A comparator circuit of the primary memory controller is used to compare a present address request corresponding to an instruction cache miss signal to the address stored in the instruction buffer. If an instruction buffer hit is achieved, memory latencies associated with the external cache controller and the primary memory controller are avoided. If an instruction buffer miss is experienced, the primary memory controller, under predetermined conditions, stores, in the instruction buffer, an address from a primary memory page specified by the present address request. This operation frequently results in the instruction buffer storing an address request that is subsequently called by a computer program. When this is achieved, the address request is rapidly retrieved without incurring the memory latency overhead of the external cache controller and the primary memory controller.

The instruction buffer of the invention facilitates improved memory latencies. In particular, the invention provides improved instruction cache miss latencies. The invention exploits the relative deterministic nature of program instruction sequences to achieve relatively high hit rates in the instruction buffer. The invention does not pollute the instruction cache with values that are never invoked. Since the technique of the invention is only executed when the memory controller is free, overall memory controller performance is not compromised. By only retrieving data of the same page of a present address, speculative addresses are rapidly obtained without applying a new row address to primary memory. The memory latency improvements of the invention are achieved without generating additional system bus traffic. Moreover, the invention does not require additional package pins.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 5:
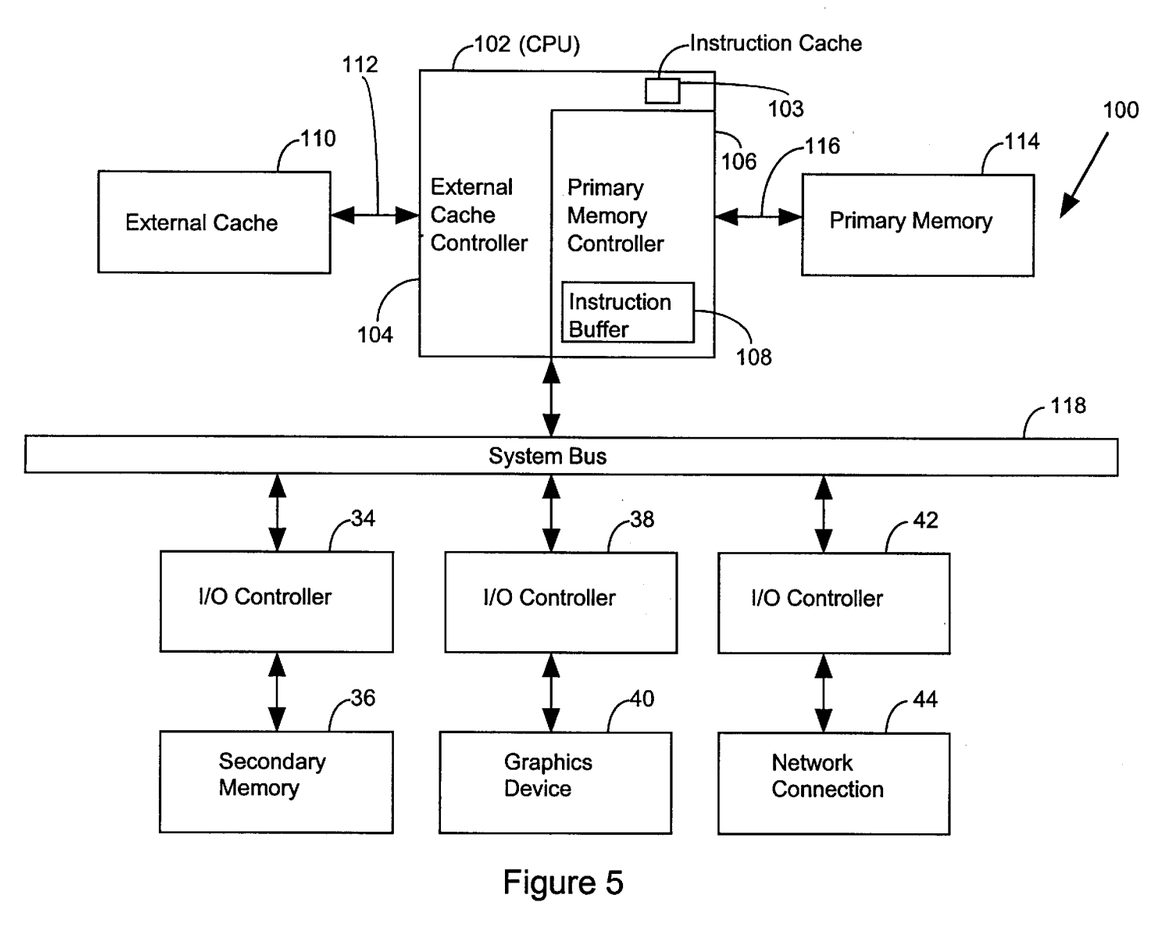
FIG. 5 illustrates a general purpose computer incorporating a central processing unit in accordance with the invention.

FIG. 5 illustrates a computer 100 constructed in accordance with one embodiment of the invention. The computer 100 includes a central processing unit (CPU) 102 with an instruction cache 103, an external cache controller 104, and a primary memory controller 106. The primary memory controller 106 includes an instruction buffer 108.

The external cache controller 104 is connected to an external cache 110 via an external cache bus 112. Similarly, the primary memory controller 106 is connected to a primary memory 114 via a primary memory bus 116.

The first noteworthy aspect of the invention is that the CPU 102 has an on-board external cache controller 104 and primary memory controller 106. This topology is in contrast to the external cache controller 26 and primary memory controller 32 being external to the CPU, as shown in FIG. 1. The close coupling of the external cache controller 104 and the primary memory controller 106 on the CPU 102 facilitates primary memory controller 106 improvements in accordance with the invention. That is, the disclosed CPU topology allows for primary memory controller 106 improvements that do not add to traffic on the system bus 118, nor do they require dedicated signal lines into the CPU 102.

The remaining elements shown in FIG. 4 are consistent with those shown in FIG. 1. Thus, they will not be discussed further. Instead, attention turns to the operation of the CPU 102 of the invention.

Figure 6:
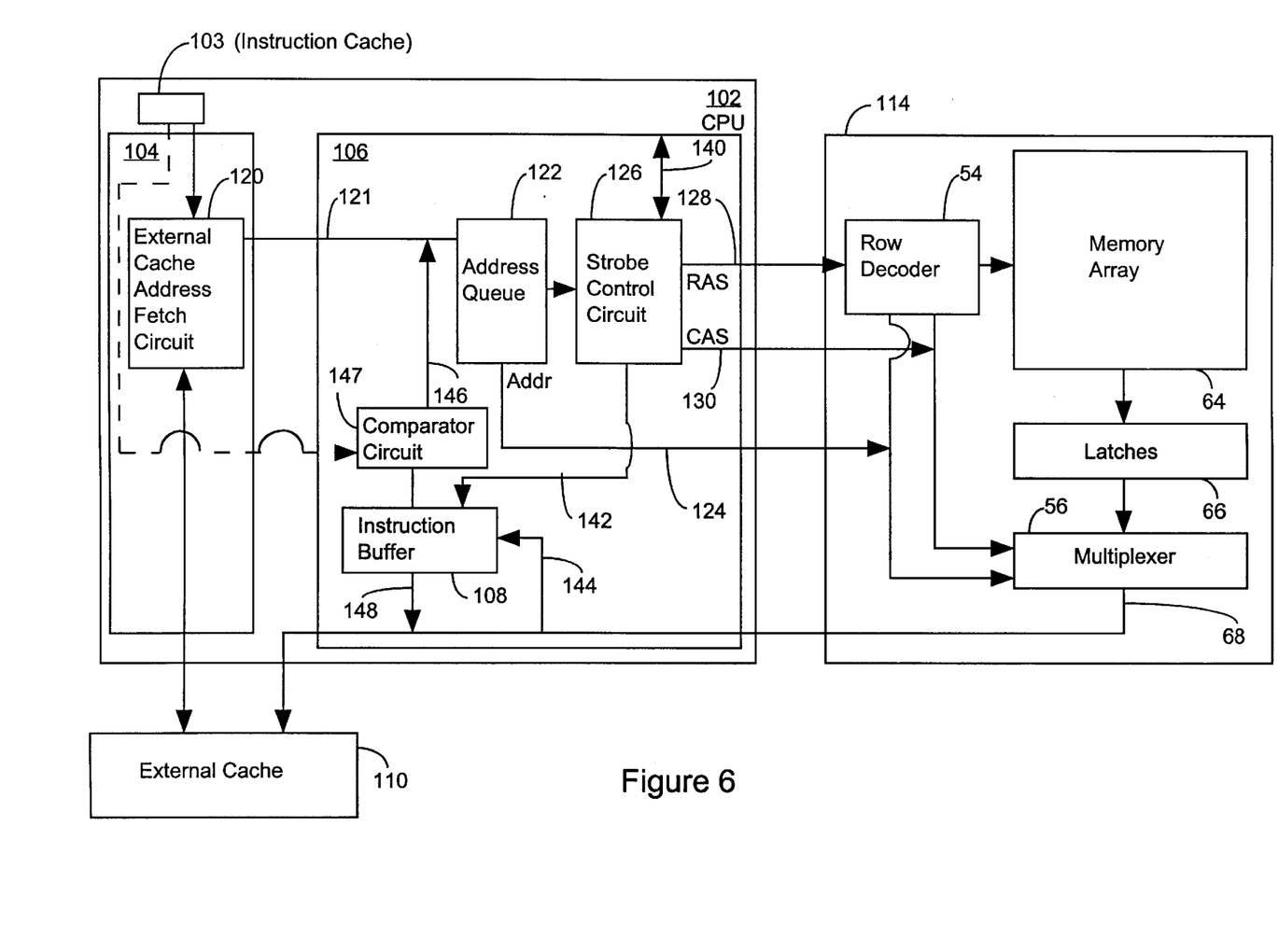
FIG. 6 illustrates a primary memory controller and primary memory in accordance with an embodiment of the invention.

FIG. 6 illustrates a CPU 102 including an on-board external cache controller 104 and primary memory controller 106 in accordance with an embodiment of the invention. The instruction cache 103 generates an instruction cache miss signal and an address request that is applied to an external cache address fetch circuit 120 of the external cache controller 104. Consistent with prior art techniques, the address fetch circuit 120 queries the external cache 110 for the specified address request. If the specified address exists in the external cache 110, then it is routed to the CPU 102 for processing. If the specified address request does not exist in the external cache 110 (a cache miss), then an external cache miss signal and the specified address are passed to the address queue 122 over line 121.

The processing of an address of an address queue is described in reference to FIG. 2. The operation of the address bus 124, the primary memory 114, and the primary memory components 54–68 are consistent with the previously described operation. However, the primary memory controller 106 of the invention uses a number of novel components to achieve improved processing of instruction cache miss signals, as will be described below.

The operation of the strobe control circuit 126 is consistent with the operation of the strobe control circuit 58 of FIG. 2. However, the strobe control circuit 126 executes additional functions in accordance with the invention. The strobe control circuit 126 is connected to a line 140 to receive an indication from the CPU 102 as to whether an address request in the address queue 122 is an instruction address request or a data address request. The close coupling of the primary or main memory controller 106 to the CPU 102 allows for this functionality. This functionality would not be practical in the prior art system of FIG. 1 because the indication of the status of the address request would have to be processed through the system bus or with a dedicated signal line.

In addition to assessing whether an address request is an instruction address request, the strobe control circuit 126 of the invention determines whether there are subsequent memory words on the memory page specified by the address request. In other words, the address request specifies a row (memory page) and a group of columns of the memory array 64. If there are additional columns following the columns specified by the address request, the strobe control circuit 126 of the invention produces an "address follow signal". The address follow signal indicates that there is at least one additional memory word following the memory word specified by the address request.

The strobe control circuit 126 also determines whether the memory controller is free for additional processing. That is, it checks the address queue 122 to confirm that there are no additional address requests to be processed and a DRAM refresh request does not exist. If the memory controller is free, a memory controller free signal is generated by the strobe control circuit.

When the strobe control circuit 126 receives an instruction cache address request and generates an address follow signal and a memory controller free signal, it proceeds to pre-fetch additional data from the memory page specified by the address request. In other words, the strobe control circuit generates a set of CAS signals to retrieve one or more memory words following the specified address request. This operation is accompanied by a signal to the instruction buffer 108 over line 142 that additional data has been fetched.

Thereafter, the data is captured by the instruction buffer 108 via line 144, which is connected to the primary memory output bus 68.

Thus, the strobe control circuit 126 facilitates the retrieving of the specified address request. The data corresponding to the specified address request is routed to the external cache 110 and is sent to the CPU 102, consistent with prior art techniques. However, the strobe control circuit 126 also retrieves additional data, under predetermined conditions, that is stored in the instruction buffer. The additional data stored in the instruction buffer is always an instruction and always follows a previous address request on the same memory page.

Those skilled in the art will recognize a number of benefits associated with the disclosed technique. First, since instruction addresses are relatively deterministic, especially in applications such as database processing, by retrieving the address or addresses following an address request, there is a strong likelihood that the retrieved address will be the subsequent address of the program. If it is, then a trip to primary memory 114 or the external cache 110 may be avoided. This can result in a substantial reduction in processing delays. Note that the technique does not load speculative data into the instruction cache 103. Thus, the invention does not pollute the instruction cache 103 with speculative data. The technique of the invention is preferably executed only when the primary memory controller is not busy. In this way, there is no compromise of primary memory controller performance. It is also noteworthy that the invention rapidly fetches speculative data because the RAS signal is maintained, while additional CAS signals are generated. In this way, there is no processing delays associated with generating a row address and producing a RAS signal.

Once the speculative data is in the instruction buffer 108 it can be compared to subsequent address requests. For example, an address request on line 121 may be tapped off with line 146 and applied to comparator circuit 147. The comparator circuit 147 then compares the address request to the address or addresses stored in the instruction buffer 148. If an instruction buffer hit occurs, the relevant data is applied over line 148 to bus 68 and is thereafter processed in a standard manner. The external cache may be avoided altogether by having the CPU 102 apply an instruction cache miss signal and corresponding address request directly to the comparator circuit 147.

Figure 7:
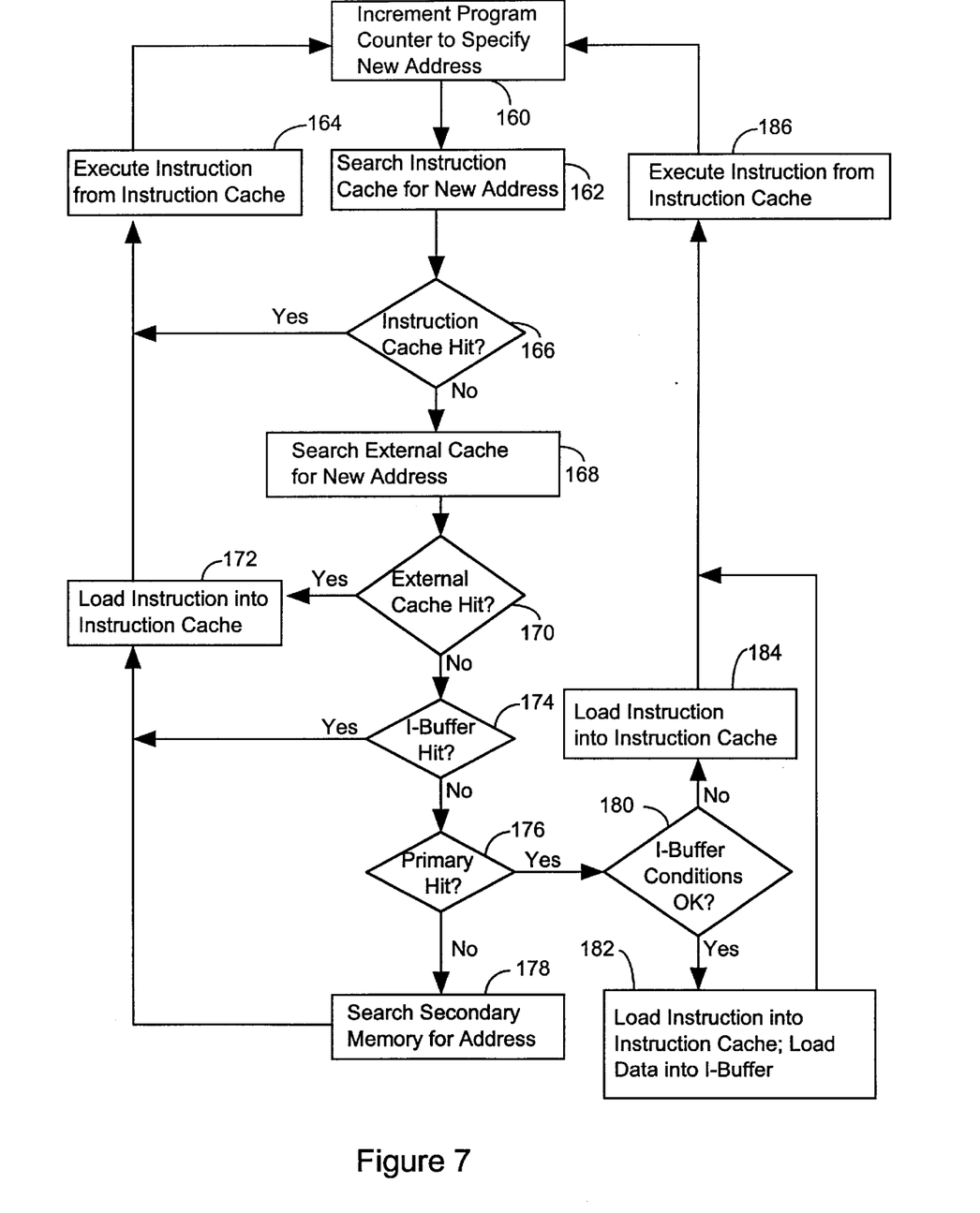
FIG. 7 illustrates the processing of an address through a computer memory hierarchy in accordance with an embodiment of the invention.

The foregoing operations are more fully appreciated with reference to FIG. 7. The first processing step shown in FIG. 7 is to increment the program counter to specify a new address (step 160). The instruction cache is then searched for the address (step 162). If a cache hit exists, as tested at step 166, the instruction in the instruction cache is executed (step 164). If an instruction cache miss occurs, then the external cache is queried for the address (step 168). If an external cache hit occurs, as tested at step 170, then the data from the external cache is loaded into the instruction cache (step 172). Thereafter, processing proceeds to step 164.

If an external cache miss occurs at step 170, then the instruction buffer 108 is searched for the address. If there is an instruction buffer hit, as tested at step 174, then the data is loaded into the instruction cache (step 172). Thereafter, processing proceeds to step 164. If there is an instruction buffer miss in step 174, then the primary memory is searched. If the address does not exist in primary memory, as tested at step 176, then the data is retrieved from secondary memory (step 178). In most cases, the address request will exist in primary memory. In such a case, the strobe control circuit 126 is used to assess instruction buffer conditions. As indicated above, the strobe control circuit 126 determines whether the address request is an instruction, whether an address follow signal has been generated, and whether a memory controller free signal has been generated. While the foregoing conditions optimize performance, variations on these conditions may be used.

If the instruction buffer conditions are met, as tested at step 180, then the data corresponding to the specified address is loaded into the instruction cache and additional data from the same memory page is loaded into the instruction buffer (step 182). Thereafter, the instruction in the instruction cache is executed (step 186). If the instruction buffer conditions are not met, the data for the specified address is loaded into the instruction cache (step 184) without loading any data in the instruction buffer.

Figure 8:
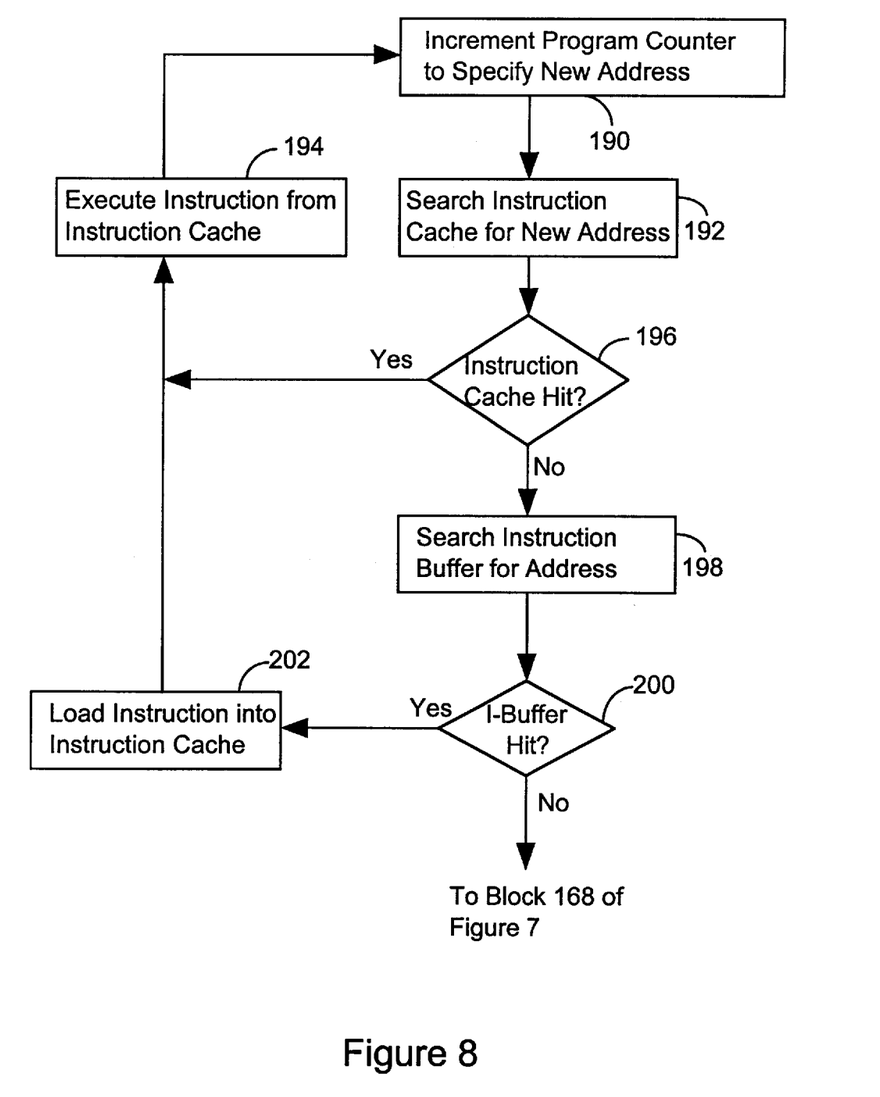
FIG. 8 illustrates the processing of an address through a computer memory hierarchy in accordance with another embodiment of the invention.

FIG. 8 illustrates the processing associated with an alternate embodiment of the invention. The processing of FIG. 8 is used when it is desired to check the instruction buffer prior to searching the external cache. In FIG. 8, instructions 190–196 are consistent with previously described operations. Step 198 is to search the instruction buffer for the requested address. If the address exists in the buffer, as tested at block 200, then it is loaded into the instruction cache (step 202). Otherwise, processing proceeds to block 168 of FIG. 7. In this case, the subsequent processing step 174 may be omitted because it is identical to step 200.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A central processing unit of a computer, comprising:

an instruction cache generating an instruction cache miss signal in response to an address request;

an external cache controller responding to said instruction cache miss signal by selectively generating an external cache miss signal; and a primary memory controller responding to said external cache miss signal by storing in a primary memory controller instruction buffer, under predetermined conditions, an additional address corresponding to data from a primary memory page specified by said address request;

wherein said primary memory controller includes circuitry to address a selected row in primary memory storing a target address corresponding to said address request, said selected row corresponding to said primary memory page;

wherein said primary memory controller includes circuitry to indentify a condition wherein said selected row in primary memory includes data corresponding to said additional address, which follows said target address in said selected row; and wherein said primary memory controller includes circuitry to store in said primary memory controller instruction buffer, said additional address when said primary memory controller has no other primary memory access demands.

2. A method of improving memory latencies in a computer, said method comprising the steps of:

generating an internal cache miss signal in response to an address request;

retrieving, from a selected page of primary memory, data corresponding to said address request; and storing in a buffer, under predetermined conditions, an additional address corresponding to data from said selected page of primary memory.

wherein said storing step includes the stop of generating an address follow signal when said additional address follows said address request on the same page;

wherein said storing step includes the step of generating a primary memory controller free signal when a primary memory controller is free; and wherein said predetermined conditions of said storing step are satisfied when said address follow signal and said primary memory controller free signal are generated.

* * * * *